UNITED STATES PATENT OFFICE.

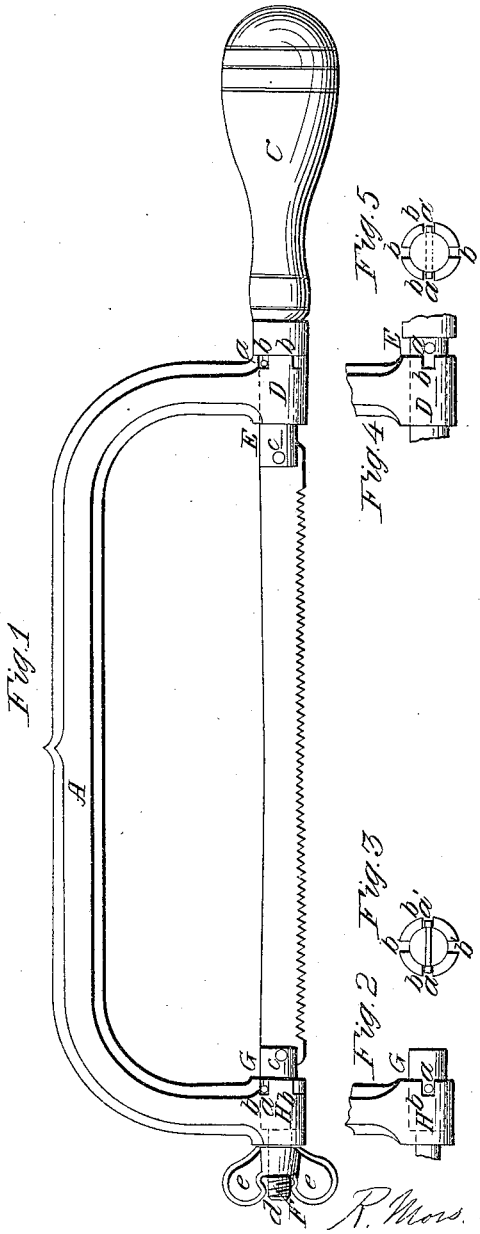
R. M. Breckenridge,
Hand Saw.
N° 52,131. Patented Jan. 23, 1866.

R. MOSS BRECKENRIDGE, OF MERIDEN, CONNECTICUT.

IMPROVEMENT IN HAND-SAWS.

Specification forming part of Letters Patent No. 52,131, dated January 23, 1866.

*To all whom it may concern:*

Be it known that I, R. MOSS BRECKENRIDGE, of Meriden, New Haven county, State of Connecticut, have invented a new and Improved Hack-Saw Frame; and I do hereby declare that the following is a full, clear, and exact description thereof, reference being had to the accompanying drawings, and to the letters of reference thereon.

In the drawings, Figure 1 is a side view of my improved frame with saw complete. Figs. 2 and 3 are side and end views, respectively, of one end of the saw-frame, showing the saw in one position; and Figs. 4 and 5 are similar views, showing the pins $a\ a'$ removed from the notches $b\ b'$, so that the saw can be readily turned to any position.

The subject of this invention is a saw-frame so arranged in connection with the saw that the latter may be turned and secured in any desired position.

I will now describe its construction and manner of operation.

The frame to which my improvements relate consists of the ordinary back piece A and handle C, to which handle the piece E is attached, passing through the part D of the frame, and having the saw F attached to it by the pin $c$. At the other end the saw is attached in a similar manner to a similar piece, G, and this piece has a thread cut on it, forming a screw at $d$, on which the nut $e$ works, for the purpose of tightening the saw and holding it in position, as I will now more fully describe.

In the parts D and H of the frame are cut notches $b\ b'\ b''$, &c., and the pieces E and G are provided with pins projecting at $a\ a'$, which fit into these notches and thus prevent the saw from turning. I cut several sets of these notches in the frame, and by loosening the nut $e$ and pulling the handle so as to remove the pin $a\ a'$ from one set the saw is free to rotate, and the pin may then be pushed back into another set of notches, and thus be firmly held in any desired position.

In this simple manner it will be seen that I obtain a saw which can be easily and readily adjusted and secured in any position in the frame, and which cannot any more easily be got out of order than the ordinary saw, and can be built with a slight increase of expense.

Now, having described my invention, what I claim as new, and desire to secure by Letters Patent, is—

Securing the saw in any desired position in the frame by means of the journals E and G, revolving in sockets D and H, to which the saw is attached, and in which are pins $a\ a\ a'\ a'$, fitting in notches $b\ b$, and clamped in place by the screw $d$ and nut $e$, when arranged and constructed substantially as described.

R. MOSS BRECKENRIDGE.

Witnesses:
ORVILLE H. PLATT,
ALFRED H. STOCKING.